US012737374B1

(12) United States Patent
Jagoe

(10) Patent No.: US 12,737,374 B1
(45) Date of Patent: Sep. 15, 2026

(54) ADAPTIVE CONTACT DATA PROCESSING USING HYBRID RULE-BASED AND INFERENCE-POWERED COLUMN MAPPING

(71) Applicant: Minted LLC, San Francisco, CA (US)

(72) Inventor: Andrew Jagoe, Castle Pines, CO (US)

(73) Assignee: Minted LLC, San Francisco, CA (US)

( * ) Notice: Subject to any disclaimer, the term of this patent is extended or adjusted under 35 U.S.C. 154(b) by 0 days.

(21) Appl. No.: 19/568,539

(22) Filed: Mar. 16, 2026

(51) Int. Cl.
*G06F 16/00* (2019.01)
*G06F 16/22* (2019.01)
*G06F 16/25* (2019.01)
*G06F 40/205* (2020.01)
*G06F 40/295* (2020.01)

(52) U.S. Cl.
CPC ........ *G06F 16/252* (2019.01); *G06F 16/2282* (2019.01); *G06F 40/205* (2020.01); *G06F 40/295* (2020.01)

(58) Field of Classification Search
None
See application file for complete search history.

(56) References Cited

U.S. PATENT DOCUMENTS 12,646,344 B1 * 6/2026 Carson .................. G06V 20/70
2004/0122855 A1 * 6/2004 Ruvolo .................. G06Q 10/40
2018/0167307 A1 * 6/2018 Barry ...................... H04L 12/44
2021/0124919 A1 * 4/2021 Balakrishnan ....... B42D 25/309
2021/0374456 A1 * 12/2021 Umakanth ............. G06V 30/10
2022/0014543 A1 * 1/2022 Jakobsson ............. H04L 51/212
2022/0050824 A1 * 2/2022 Gartner .................... G06N 3/08
2022/0067185 A1 * 3/2022 Chikoti ................. G06F 40/151
2022/0385656 A1 * 12/2022 Gujarathi ............ H04L 63/0876
2024/0338576 A1 * 10/2024 Radon ..................... H04L 41/16
2026/0079455 A1 * 3/2026 Nachmany ......... G05B 13/0265
2026/0148235 A1 * 5/2026 LaQuerre ........... G06Q 20/4016

FOREIGN PATENT DOCUMENTS

CN 121707697 A * 3/2023
CN 121504408 A * 2/2026 ......... G06F 16/9024

* cited by examiner

*Primary Examiner* — Hasanul Mobin
(74) *Attorney, Agent, or Firm* — Jones Day

(57) ABSTRACT

A computing system receives an input file containing contact information and parses the file to extract columns and rows of contact data. The system computes an essential-field coverage metric quantifying how well parsed columns map to required contact fields. When the metric meets or exceeds a threshold, the system performs rule-based column mapping using exact header matching against known external formats to generate a first mapping. When the metric falls below the threshold or rule-based mapping is unavailable, the system invokes a large language model-based column mapping engine to produce a second mapping comprising structured output conforming to a predefined schema. The system extracts contact information using the first or second mapping to generate structured contact data and provides the structured contact data to a consuming application or process. Related apparatus, systems, techniques and articles are also described.

30 Claims, 5 Drawing Sheets

ADAPTIVE CONTACT DATA PROCESSING USING HYBRID RULE-BASED AND INFERENCE-POWERED COLUMN MAPPING

TECHNICAL FIELD

The present disclosure relates to data processing systems and computer-implemented methods for ingesting and normalizing contact information from heterogeneous electronic file formats, and more particularly to systems that adaptively route column mapping operations between rule-based deterministic mapping engines and large language model inference-powered mapping engines based on computed essential-field coverage metrics.

BACKGROUND

Modern enterprise systems rely upon the continuous ingestion, normalization, and validation of structured and semi-structured data originating from heterogeneous external sources, including third-party data feeds, spreadsheet workbooks, delimited text files exported from disparate legacy applications, serialized data interchange formats, and domain-specific record formats that lack standardized schemas. Conventional parsing engines employ deterministic, rule-based matching algorithms that operate on fixed header lexicons; while such engines achieve acceptable throughput when processing files that conform strictly to known export schemas, they exhibit prohibitively high error rates and latency spikes when confronted with unstructured or ambiguously labeled columnar data, resulting in cascading downstream system failures, data corruption, and costly manual remediation cycles. Legacy deterministic parsers lack the ability to dynamically assess whether a given input file provides sufficient coverage of essential data fields—that is, the subset of fields required by downstream systems for meaningful processing—and therefore cannot intelligently select between lightweight rule-based mapping paths and more computationally intensive probabilistic mapping strategies, leading to suboptimal allocation of memory buffers, processing threads, and network bandwidth when communicating with external validation services.

SUMMARY

A computing system receives an input file containing contact information and parses the file to extract columns and rows of contact data. The system computes an essential-field coverage metric that quantifies how well the parsed columns map to required contact fields such as name and address information. When the coverage metric meets or exceeds a threshold, the system performs rule-based column mapping using exact header matching against known external formats to generate a first mapping. When the coverage metric falls below the threshold or rule-based mapping is unavailable, the system invokes a large language model-based column mapping engine to produce a second mapping that conforms to a predefined schema. The system then extracts contact information using either the first or second mapping to generate structured contact data and provides this data to a consuming application or process.

The system can verify addresses within the structured contact data by classifying each address as a US address, an international address, or an ambiguous address, and routing each address to an appropriate verification service. For ambiguous addresses, the system can invoke a large language model to interpret address components. The system can automatically detect the file format of the input file by inspecting file extensions, where the format can be a delimited text format, a spreadsheet workbook format, or an electronic business card format. For delimited text formats, the system can tokenize records by line boundaries and split field values by detected delimiter characters. For spreadsheet formats, the system can traverse cell ranges within worksheets and extract cell values with data-type annotations. For electronic business card formats, the system can interpret property-value pairs according to a predefined specification.

The system can generate metadata that includes a mapping confidence score, the essential-field coverage metric, and a decision reasoning record documenting which mapping was selected. This metadata can be serialized alongside the structured contact data for downstream audit and quality assessment. When the system detects a failure condition such as a network timeout, inference endpoint outage, or inference failure when invoking the large language model-based mapping engine, the system can revert to a fallback mapping using relaxed heuristics. These relaxed heuristics can include normalization-based matching, underscore-to-space conversion, abbreviation expansion, or fuzzy header matching using Levenshtein distance, Jaro-Winkler similarity, or substring containment.

The system can normalize the structured contact data by converting street type abbreviations to standardized forms, normalizing state and province names to postal abbreviations, formatting postal codes according to locale-specific patterns, and standardizing country names. The system can validate the structured contact data by verifying that required fields are present, that field values conform to expected data types and formats, that field lengths do not exceed maximum values, and by annotating rejected rows with failure codes. The system can select among multiple inference service endpoints based on cost-optimized decision making that considers API call latency, monetary cost per call, current queue depth, and historical performance data.

Prior to computing the essential-field coverage metric, the system can perform smart header row detection by evaluating the first row as a primary header candidate, detecting exception patterns such as empty rows, instruction blocks, metadata rows, or title blocks if validation fails, searching for an actual header row using characteristic analysis, and falling back to treating the first row as the header row if no header is identified. The rule-based column mapping can occur in two phases: a first phase performing exact string matching against a header lexicon, and a second phase performing normalized matching with case normalization, underscore-to-space conversion, and abbreviation expansion for unmatched headers. The threshold can use a dual-threshold configuration where a lower confidence threshold applies when essential fields are satisfied and a higher confidence threshold applies when essential fields are not satisfied.

The system can transmit the structured contact data via a network interface as a serialized data payload to a remote server, reducing network bandwidth consumption compared to transmitting the original input file. The system can instantiate a file processor in a memory buffer configured to receive the input file via a network interface, generate a parsed data structure stored in the memory buffer as a two-dimensional array of column headers and row values, and transmit the parsed data structure to a column mapper. A container orchestration system can scale the file processor, column mapper, and contact extractor independently based on processing load metrics, allocating additional processing threads or memory buffers to bottleneck stages without over-provisioning resources, thereby conserving CPU cycles, memory allocations, and network bandwidth.

A server computing device can execute a modular multi-stage processing pipeline for ingesting and normalizing contact data. The pipeline instantiates a file processor in a memory buffer to receive input files via a network interface, automatically detect file formats, and parse files to generate a parsed data structure. A column mapper executes exact header matching against a header lexicon to generate a first mapping while concurrently computing an essential-field coverage metric. When the metric falls below a configurable threshold, a large language model-powered mapping engine invokes an inference service endpoint to receive a structured mapping output constrained to a predefined schema. A contact extractor receives the mapping and parsed data structure, extracts contact field values from each row, normalizes values into canonicalized contact records, and validates records through field-level checks. A metadata generator produces metadata including mapping confidence, coverage percentage, and decision reasoning, and the system outputs a canonicalized contact dataset to a downstream application.

The column mapper can execute a defined fallback sequence that attempts rule-based mapping, evaluates the essential-field coverage metric, invokes the large language model-powered mapping engine when the metric is below threshold, and reverts to rule-based fallback with relaxed heuristics upon detecting inference endpoint unavailability or failure. The metadata generator can record fallback events including timestamps, failed endpoint identifiers, and error codes for downstream audit. The system can dynamically select among inference service endpoints operated by different large language model providers based on service availability indicators and latency measurements from health check requests. The system can adapt cost-optimized decision making over time by logging provider selection events and applying reinforcement learning or multi-armed bandit algorithms that balance exploration of provider options with exploitation of historically low-cost, high-reliability providers.

The container orchestration system can scale the file processor, column mapper, and contact extractor independently based on processing load metrics to allocate resources to bottleneck stages without over-provisioning. The large language model-powered mapping engine can receive a confidence distribution per mapped field and an explanation token sequence articulating reasoning behind each mapping decision. A system with one or more processors, memory storing instructions, and interfaces to receive files can read input files, automatically detect file formats, parse files to obtain structured contact data, apply rule-based mapping, invoke large language model-powered mapping when coverage is insufficient, normalize and validate contacts into a canonical schema, generate metadata, and output canonicalized contact datasets. The system can execute a fallback sequence upon detecting failure conditions when invoking the large language model-powered mapping pipeline.

A computing system can extract recipient names from envelope-based contact sources by receiving input text containing envelope content, pre-cleaning the text by extracting and removing address components to prevent false positive name matches, applying custom regex patterns optimized for envelope recipient formats and validating matches using natural language processing, applying named entity recognition to identify person names, and outputting an extracted recipient name. When the regex patterns, natural language processing validation, and named entity recognition fail to identify a recipient name with sufficient confidence, the system can invoke a large language model to extract the recipient name. The custom regex patterns can include patterns for matching family designations, spousal designations, and honorific prefixes.

The subject matter can be embodied in non-transitory computer-readable media storing executable instructions that, when executed by one or more processors, cause the processors to perform the operations described herein. Computing systems implementing the platform can include one or more processors coupled to memory, where the memory can store programs or modules that configure the processors to execute the described operations. The platform can be deployed across distributed computing environments, including cloud-based infrastructure, containerized microservices architectures, edge computing nodes, or hybrid configurations spanning multiple data centers or availability zones.

The described subject matter improves computer functioning by reducing computational overhead, optimizing memory utilization, and enhancing service reliability compared to conventional systems. This is primarily achieved by dynamically routing workloads between lightweight rule-based and computationally intensive inference pipelines based on real-time essential-field coverage, thereby conserving CPU cycles, memory allocations, and network bandwidth. System resilience and consistent throughput are further maintained through a multi-tier fallback sequence that reverts to rule-based processing during inference failures, alongside adaptive, cost-optimized routing based on historical performance logs. Finally, a modular architecture separating file processing, column mapping, and data extraction enables the independent scaling of individual processing stages, allowing targeted resource allocation to bottlenecks without over-provisioning.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to providing adaptive contact data processing using hybrid rule-based and inference-powered column mapping. The described subject matter improves computer functioning by reducing computational overhead, optimizing memory utilization, and enhancing service reliability compared to conventional systems. This is achieved, in part, by dynamically routing workloads between lightweight rule-based and computationally intensive inference pipelines based on real-time essential-field coverage, thereby conserving CPU cycles, memory allocations, and network bandwidth. System resilience and consistent throughput are further maintained through a multi-tier fallback sequence that reverts to rule-based processing during inference failures, alongside adaptive, cost-optimized routing based on historical performance logs. A modular architecture separating file processing, column mapping, and data extraction enables the independent scaling of individual processing stages, allowing targeted resource allocation to bottlenecks without over-provisioning.

Computing systems implementing the described platform can include one or more processors coupled to memory, where the memory can store programs that configure the processors to execute the described operations. The platform can be deployed across distributed computing environments, including cloud-based infrastructure, containerized microservices architectures, edge computing nodes, or hybrid configurations spanning multiple data centers or availability zones.

Figure 1:
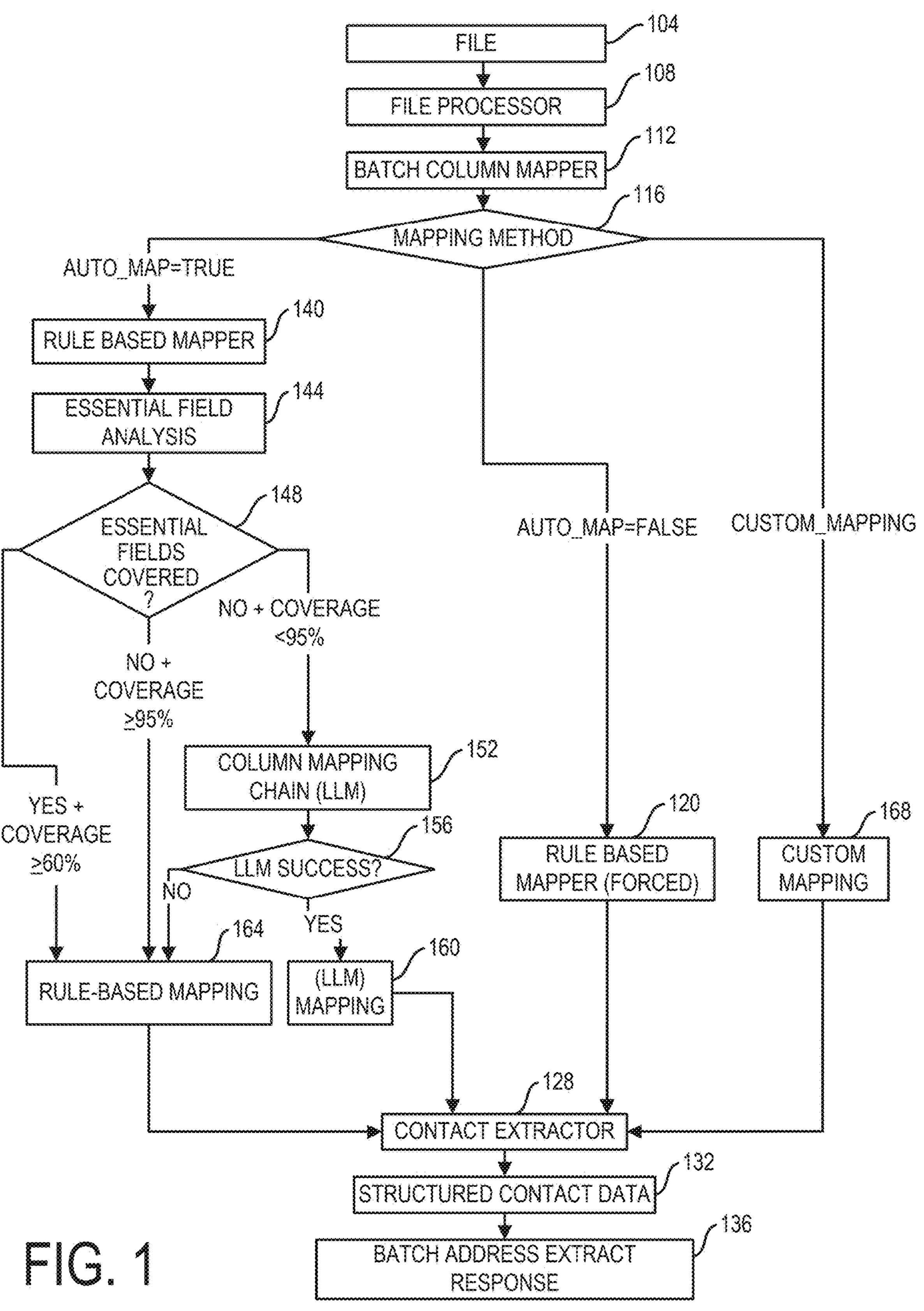
FIG. 1 is a process flow diagram illustrating an adaptive contact data processing pipeline that routes column mapping operations between rule-based deterministic mapping and large language model (LLM) inference-powered mapping based on computed essential-field coverage metrics.

Referring now to FIG. 1, a process flow diagram illustrates an adaptive contact data processing pipeline that routes column mapping operations between rule-based deterministic mapping and large language model (LLM) inference-powered mapping based on computed essential-field coverage metrics.

Initially, an input file 104 containing contact information can be received by a file processor 108. The file processor 108 can be instantiated by one or more hardware processors in a memory buffer and can be configured to receive the input file via a network interface. The file processor 108 automatically detects a file format of the input file by inspecting file extensions (e.g., .csv, .xlsx, .xls, .vcf) to identify the format type. The file format can take varying forms including one of a delimited text format (such as CSV), a spreadsheet workbook format (such as XLSX), or an electronic business card format (such as vCard 3.0). The file processor 108 can further employ parsing heuristics to perform header row detection, analyzing candidate rows to identify the row containing column headers (see FIG. 3).

The file processor 108 can employ a multi-step heuristic algorithm for smart header row detection. The algorithm can initially evaluate row 0 as the primary header candidate. If validation of row 0 fails, the algorithm can detect exception patterns including empty rows, instruction blocks, metadata rows, and title blocks that can precede the actual header row. The algorithm can then search for the actual header row using characteristic analysis, including matching against known header terms and evaluating keyword density indicative of header content. If no clear header row is identified through characteristic analysis, the algorithm can fall back to treating row 0 as the header row.

Responsive to the file format being a delimited text format, the file processor 108 tokenizes records by line boundaries and splits field values by a detected delimiter character with handling for quoted field values and escape sequences. Responsive to the file format being a spreadsheet workbook format, the file processor 108 traverses cell ranges within one or more worksheets and extracts cell values along with data-type annotations. Responsive to the file format being an electronic business card format, the file processor 108 interprets property-value pairs according to a predefined specification and maps the property-value pairs to a columnar representation.

Responsive to the file format being the electronic business card format, the file processor 108 can perform structural parsing including decomposition of structured name fields (e.g., parsing N property into given name, family name, prefixes, and suffixes), mapping TYPE parameters to application labels (e.g., mapping WORK to "Work" and HOME to "Home"), normalizing birthday formats from compact representations (e.g., YYYYMMDD) to standard date formats (e.g., YYYY-MM-DD), extracting photo URLs from NOTE fields when present, and filtering system-generated labels.

The file processor 108 parses the input file according to the detected file format to generate a parsed data structure stored in the memory buffer, the parsed data structure comprising a two-dimensional array of column headers and row values. The parsed data structure is then transmitted to a column mapper 112.

The file processor 108 can utilize encoding detection with a fallback mechanism for non-UTF-8 encoded files, attempting to detect and convert from alternate character encodings. For spreadsheet workbook formats, the file processor 108 can perform XLSX structure validation and, upon detecting a malformed XLSX file, can fall back to CSV parsing as a recovery mechanism. Required contact fields, as used in essential-field coverage calculations, can be broadly defined to include any combination of name-related fields (such as full name, first name, last name, or organization name) and address-related fields (such as street address, city, state/province, postal code, or country) necessary for downstream processing.

The column mapper 112 comprises a rule-based mapping component and an LLM-powered mapping component. At decision point 116, the system determines whether automatic mapping is enabled (AUTO_MAP=TRUE), if automatic mapping is disabled (AUTO_MAP=FALSE), or whether a custom mapping path is to be invoked. The custom mapping path leading to a custom mapping 168 defining rules and/or heuristics for mapping.

When automatic mapping is enabled, the system can proceed to 140 where a rule-based mapper performs exact header matching against a header lexicon comprising known external formats. The rule-based mapper can perform exact header matching for known formats including Google Contacts, Outlook, predefined export schemas, and the like. The rule-based mapper generates a first mapping associating source column indices with canonical field identifiers.

The rule-based mapping can occur in two phases. In a first phase (exact matching), the rule-based mapper can perform exact string matching of source column headers against the header lexicon. In a second phase (normalized matching), for any headers not matched in the first phase, the rule-based mapper can apply normalization-based matching comprising case normalization, underscore-to-space conversion, and common abbreviation expansion to match headers that differ only in formatting or common variations from lexicon entries.

At 144, concurrently with or following the rule-based mapping, an essential field analysis operation can compute an essential-field coverage metric. The essential-field coverage metric quantifies a degree to which parsed columns map to required contact fields, specifically quantifying the presence of name and address fields. The essential-field coverage analysis enables cost-optimized decision making by determining whether lightweight rule-based processing is sufficient or whether more computationally intensive LLM-based inference is warranted.

At decision point 148, the system evaluates whether essential fields are covered based on the computed essential-field coverage metric. In one example, the system can evaluate whether the coverage metric meets or exceeds one or more thresholds. If the essential-field coverage metric meets or exceeds the threshold (YES+COVERAGE >60%), the system proceeds along a rule-based mapping path to 140, generating a rule-based mapping output. If the essential-field coverage metric does not meet or exceed the threshold but the coverage is above a higher threshold (NO+COVERAGE >95%), the system proceeds along a rule-based mapping path to 140, generating a rule-based mapping output If the essential-field coverage metric is below the threshold (NO+COVERAGE <95%), the system can proceed to 152, where a column mapping chain invokes the LLM-powered mapping component. The LLM-powered mapping component invokes an inference service endpoint by transmitting a prompt payload comprising the column headers and a description of a target canonical schema via the network interface. The system can receive a structured mapping output constrained to a predefined output schema encoded as a JSON schema or function-calling specification. The structured mapping output can include a confidence score per mapped field (e.g., a 0.0-1.0 float value) indicating the model's confidence in each mapping decision, and an explanation token sequence generated by the inference service endpoint articulating reasoning behind each mapping decision. In some examples, the confidence output can alternatively comprise softmax probabilities or logit scores.

The LLM-powered mapping component can integrate with one or more inference service providers for intelligent column mapping. In some examples, the system can dynamically select among a plurality of inference service endpoints operated by different large language model providers based on service availability indicators and latency measurements obtained via health check requests transmitted via the network interface. In some examples, the system can further select among the plurality of inference service endpoints based on cost-optimized decision making that considers inference application programming interface (API) call latency, monetary cost per API call, current queue depth, and historical performance data. In some examples, the system can adapt cost-optimized decision making over time by logging provider selection events and applying a reinforcement learning algorithm or multi-armed bandit algorithm that balances exploration of provider options with exploitation of historically low-cost, high-reliability providers.

At decision point 156, the system determines whether the LLM invocation was successful. If the LLM processing succeeds (YES), the system proceeds with the LLM mapping at 160 to generate an LLM-based mapping output. Responsive to detecting a failure condition comprising at least one of a network timeout, an inference endpoint outage, or an inference failure when invoking the LLM-based column mapping component, the system executes a defined fallback sequence.

If the LLM processing does not succeed (NO), the system can revert to rule-based mapping at 164 using, for example, relaxed heuristics. The relaxed heuristics can comprise normalization-based matching including case normalization, underscore-to-space conversion, and common abbreviation expansion (e.g., expanding "addr" to "address," "ph" to "phone"). In some examples, the relaxed heuristics can alternatively or additionally comprise fuzzy header matching using Levenshtein distance, Jaro-Winkler similarity, or substring containment. A metadata generator can record fallback events comprising a timestamp, an identifier of the inference service endpoint that failed, and an error code, the fallback events being included in the metadata for downstream audit.

The fallback sequence ensures a robust fallback system that maintains service reliability during LLM API outages or failures. The defined fallback sequence comprises: attempting rule-based mapping using the rule-based mapping component, evaluating the essential-field coverage metric, invoking the LLM-powered mapping component when the essential-field coverage metric is below the configurable threshold, and reverting to rule-based fallback with relaxed heuristics upon detection of inference endpoint unavailability or failure.

The mapping output (whether from 120, 164, or 168) is provided to a contact extractor 128. The contact extractor 128 is configured to receive the first mapping or the structured mapping output along with the parsed data structure. The contact extractor 128 extracts contact field values from each row of the parsed data structure using the received mapping.

For envelope-based contact sources, the contact extractor 128 can employ a three-stage hybrid approach for extracting recipient names. In a first stage, the system can pre-clean input text by extracting and removing address components to prevent address fragments from creating false positive name matches. In a second stage, the system can apply custom regex patterns optimized for envelope recipient formats (e.g., "The [Name] Family," "Mr. and Mrs. [Name]") with validation using spaCy natural language processing. In a third stage, the system can utilize spaCy named entity recognition (NER) with smart entity selection to identify person names. For complex or ambiguous cases that are not resolved by the preceding stages, the system can fall back to LLM-based name extraction.

The contact extractor 128 normalizes the extracted field values into canonicalized contact records conforming to the target canonical schema. Normalizing the structured contact data can comprise formatting postal codes according to locale-specific patterns and standardizing country names to a predefined specification. Additional address normalization, such as converting street type abbreviations to standardized forms and normalizing state and province names to standard postal abbreviations, is performed by the address verification pipeline (FIG. 2) as part of USPS API validation for US addresses.

The contact extractor 128 validates the canonicalized contact records by performing field-level checks comprising data type verification, format verification, and length verification. Validating the structured contact data can further comprise verifying that required fields are present, verifying that field values conform to expected data types and formats, verifying that field lengths do not exceed maximum permitted values, and annotating rejected contact rows with failure codes for remediation.

The system can generate metadata and output structured contact data 132 comprising a mapping confidence score, the essential-field coverage metric, and a decision reasoning record that documents whether the first mapping or the second mapping was selected. The metadata can comprise mapping confidence, essential-field coverage percentage, and decision reasoning. The metadata can be serialized alongside the structured contact data for downstream audit and quality assessment.

At 136, the contact extractor 128 can output the structured contact data comprising the canonicalized contact records and the metadata as a batch address extract response. The canonicalized, validated contact dataset can be output to a downstream consuming application via the network interface. The downstream consuming application or process can receive the batch address extract response.

A container orchestration system can scale the file processor 108, the column mapper 112, and the contact extractor 128 independently based on processing load metrics, thereby allocating additional processing threads or memory buffers to bottleneck stages without over-provisioning resources for stages operating within capacity.

Figure 2:
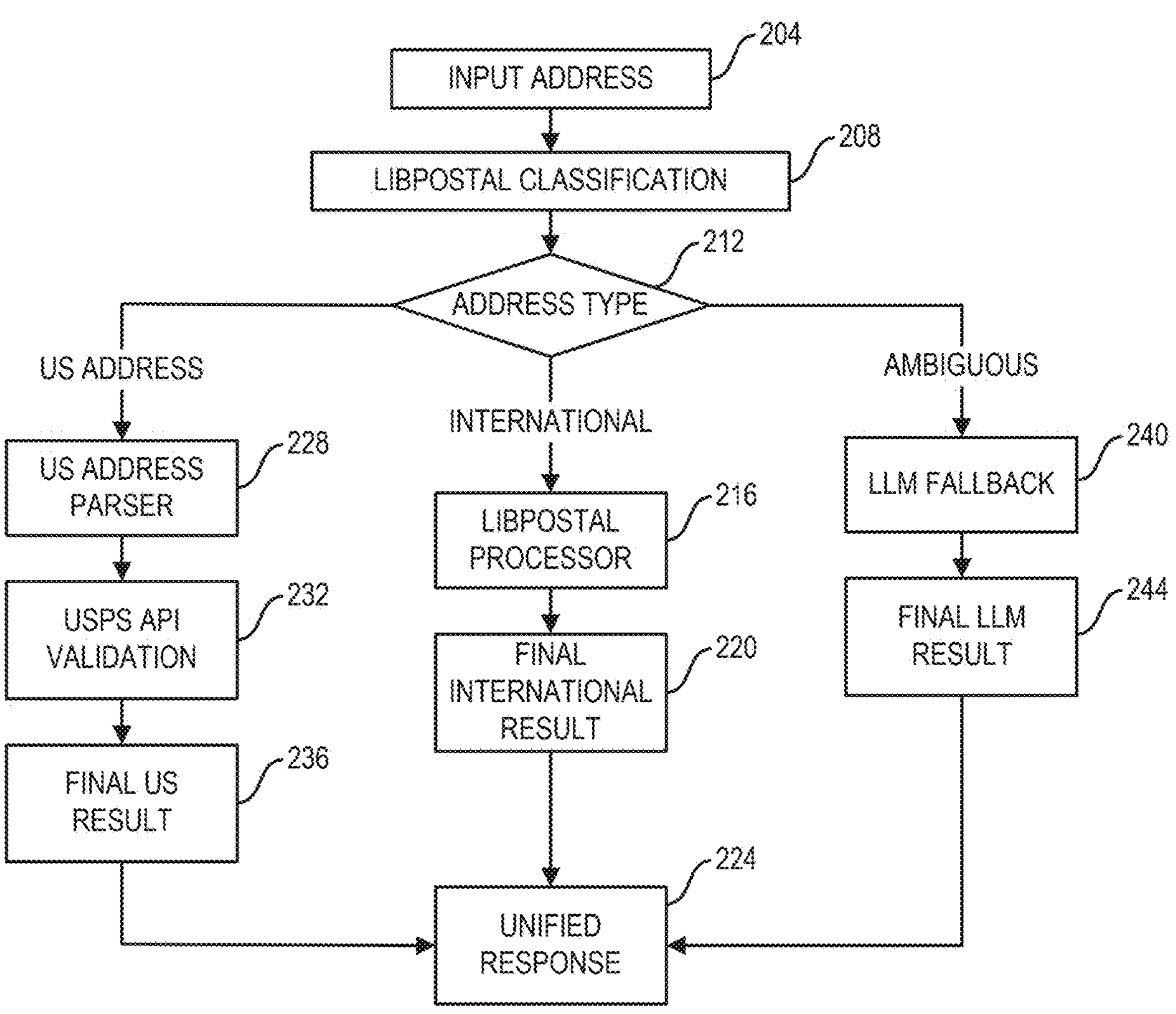
FIG. 2 is a process flow diagram illustrating an address verification and classification pipeline that classifies input addresses, routes the addresses to specialized processors based on address type, and generates unified verification responses.

Referring now to FIG. 2, a process flow diagram illustrates an address verification and classification pipeline that can be invoked by a consuming application or process to verify addresses within the structured contact data.

At 204, an input address can be received from the structured contact data. The address verification pipeline can, for example, employ a Libpostal-first classification approach with intelligent routing to specialized processors.

At 208, a Libpostal classification component can perform address classification using statistical natural language processing (NLP) and machine learning techniques. Libpostal is a trained model for global address classification and international parsing supporting 160+ countries. The classification operation is designed for fast processing with typical latency of 1-5 ms.

At decision point 212, the system determines the address type based on the Libpostal classification. The address can be classified as an address of a first type (US address), an address of a second type (international address), or an address of an unknown type (ambiguous). The routing decision can be based on classification confidence scores.

Responsive to the address being classified as a US address (first type), the system proceeds along path to a US address parser 228. The US address parser 228 can, for example, utilize the usaddress Python library, which is designed for US-specific parsing with USPS compliance. The parsed address is then transmitted to a USPS API 232 for validation.

At 232, the USPS API can perform address validation, correction, and delivery confirmation for US addresses. The USPS API provides authoritative US address validation and correction. The validation operation can produce suggested addresses from USPS corrections. At 236, the system can generate a final US result that is provided to 224 for unified response generation.

Responsive to the address being classified as an international address (second type), the system proceeds along path to a Libpostal processor 216. The Libpostal processor 216 performs specialized extraction for international addresses using the Libpostal trained model. At 220, the system can generate a final international result that is provided to 224 for unified response generation.

Responsive to the address being classified as ambiguous (unknown type), the system proceeds along path to an LLM fallback component at 240. The LLM fallback component invokes a large language model to interpret address components and confirm accuracy of the address. This provides an intelligent fallback for cases where the classification confidence is insufficient to route to a specialized processor. At 244, the system can generate a final LLM result that is provided to 224 for unified response generation.

The unified response component can aggregate results from the various processing paths. The address verification pipeline generates confidence scoring that combines classification, parsing, and validation results. The enhanced response format includes the parsed address along with suggested addresses from USPS corrections where applicable. The system generates comprehensive metadata including processing method, validation status, and performance metrics.

The fallback strategy for address classification follows a defined sequence: direct Libpostal classification as the primary method, HTTP service invocation as a secondary method when direct classification is unavailable, and regex pattern matching as a tertiary method for basic address type identification. Upon classification, the address is routed to the appropriate specialized processor. For ambiguous or unclassified addresses, LLM processing provides intelligent interpretation. This multi-tier approach ensures robust address classification and verification even when primary processing paths encounter failures or ambiguous inputs.

Figure 3:
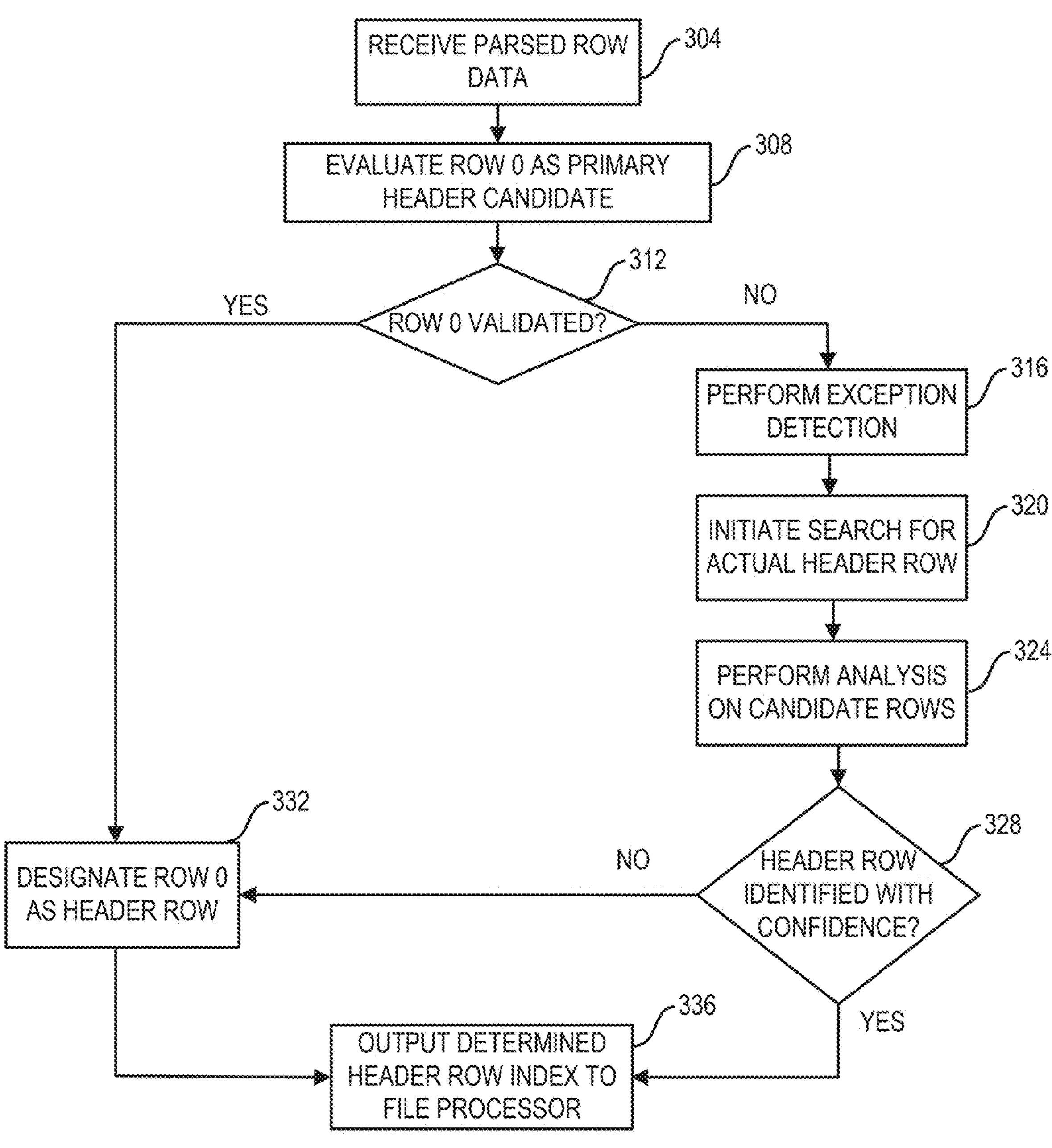
FIG. 3 is a process flow diagram illustrating a smart header row detection algorithm that identifies a header row within an input file using multi-step heuristic analysis.

Referring now to FIG. 3, a process flow diagram illustrates the smart header row detection process. At 304, the process can receive parsed row data from the file processor. At 308, the process can evaluate row 0 as the primary header candidate by analyzing cell contents for header-like characteristics. At decision point 312, if row 0 validation succeeds (YES), the process can proceed to 336 and designate row 0 as the header row. If row 0 validation fails (NO), the process can proceed to 316 where exception pattern detection is performed. At 316, the process can identify exception patterns including empty rows, instruction blocks containing user guidance text, metadata rows containing file properties, and title blocks containing document titles. At 320, the process can initiate a search for the actual header row by analyzing subsequent rows. At 324, characteristic analysis can be performed on candidate rows, including matching cell contents against a database of known header terms (e.g., "Name," "Address," "Phone," "Email") and evaluating keyword density. At decision point 328, if a header row is identified with sufficient confidence (YES), the process can proceed to designate the identified row as the header row. If no clear header row is identified (NO), the process can proceed to 332 and fall back to designating row 0 as the header row. The process can, at 336, output the determined header row index to the file processor for subsequent parsing operations.

Figure 4:
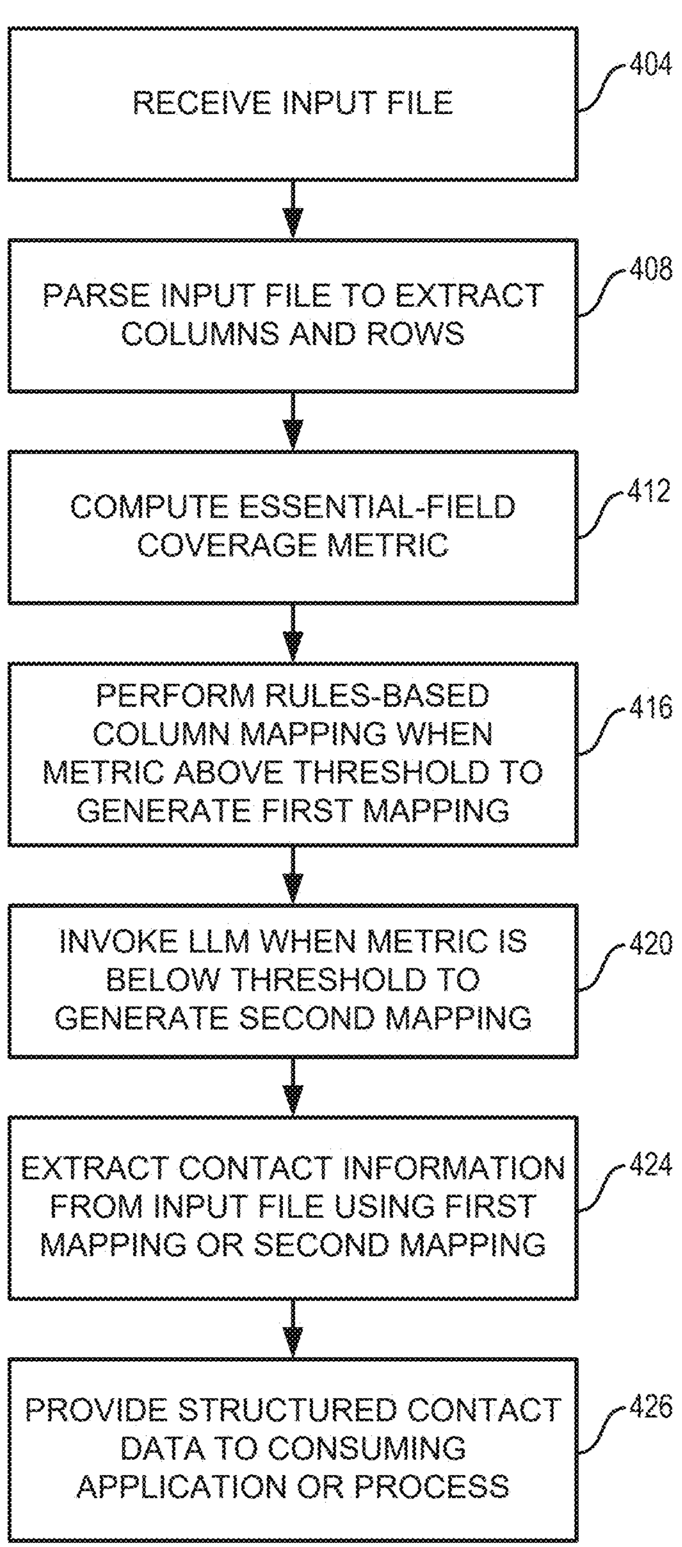
FIG. 4 is a process flow diagram illustrating adaptive contact data processing using hybrid rule-based and inference-powered column mapping.

Referring now to FIG. 4, a process flow diagram illustrates a method for adaptive contact data processing in which, at 404, an input file is received containing contact information. Thereafter, at 408, the input file is parsed to extract columns and rows of contact data. This parsing generates a structured representation of the data that can be further analyzed. Following parsing, at 412, an essential-field coverage metric is computed based on the parsed data. This metric quantifies the degree to which the parsed columns map to a set of required contact fields, such as name and address information.

A decision is then made based on this metric. If the essential-field coverage metric meets or exceeds a predetermined threshold, at 416, rule-based column mapping 416 is performed. This rule-based mapping uses exact header matching against one or more known external formats to generate a first mapping.

However, if the essential-field coverage metric is below the threshold, or if the rule-based column mapping is otherwise unavailable, a large language model (LLM)-based column mapping engine, is at 420, invoked. This engine produces a second mapping, which comprises a structured mapping output that conforms to a predefined schema, ensuring compatibility with downstream systems.

Regardless of which mapping was generated, at 424, contact information is extracted from the input file using either the first mapping or the second mapping. This process generates structured contact data. Finally, the method concludes, at 426, by providing the structured contact data to a consuming application or process for further use.

Figure 5:
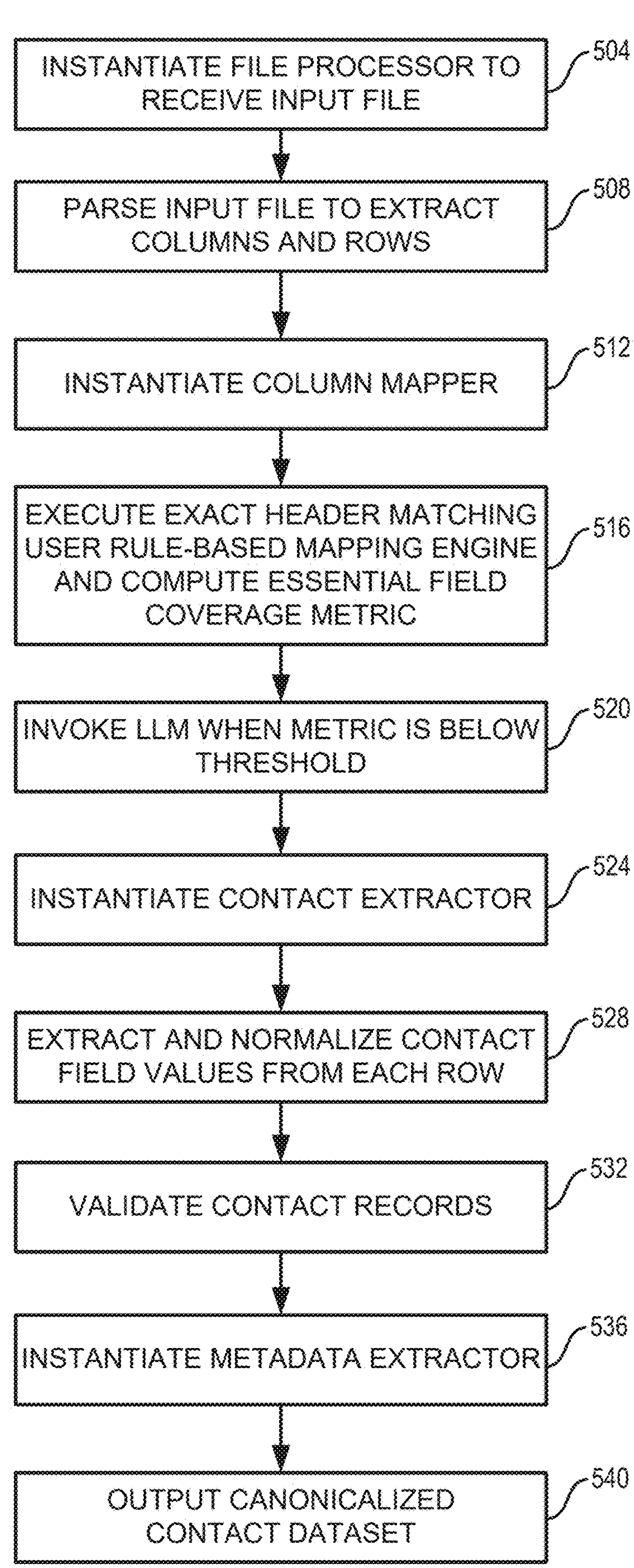
FIG. 5 is a process flow diagram illustrating ingesting and normalizing contact data using a modular multi-stage processing pipeline executing on a server computing device.

Referring now to FIG. 5, a process flow diagram illustrates a computer-implemented method for ingesting and normalizing contact data using a modular multi-stage processing pipeline executing on a server computing device. Initially, at 504, a file processor is instantiated in a memory buffer. The file processor is configured to receive an input file via a network interface and to automatically detect the file's format by inspecting extensions. The file processor, then, at 508, parses the input file according to its detected format to generate a parsed data structure stored in the memory buffer, with the structure comprising a two-dimensional array of column headers and row values.

Next, at 512, a column mapper 516 is instantiated which can include or otherwise execute a rule-based mapping engine and a large language model-powered mapping engine. The rule-based mapping engine, at 516, executes to perform exact header matching against a header lexicon, generating a first mapping that associates source column indices with canonical field identifiers. Concurrently, it computes an essential-field coverage metric that quantifies the presence of critical fields like name and address. If this metric falls below a configurable threshold, at 520, the LLM-powered mapping engine is invoked. It calls an inference service endpoint, transmitting a prompt payload with the column headers and a target schema description, and in return, receives a structured mapping output constrained to a predefined format such as a JSON schema.

A contact extractor configured to receive the generated mapping (either from the rule-based or LLM engine) and the parsed data structure is, at 524, instantiated. The contact extractor, at 528, proceeds to extract contact field values from each row of the parsed data structure and normalizes these values into canonicalized contact records that conform to the target schema. The contact extractor also, at 532, validates the canonicalized contact records by performing various field-level checks, including data type, format, and length verification, and annotates any rejected rows with failure codes for later review.

A metadata generator, which is configured to create metadata including mapping confidence, the essential-field coverage percentage, and a record of the decision reasoning is, at 536, instantiated. A canonicalized contact dataset which includes the canonicalized contact records and the associated metadata is output, at 540, to a downstream consuming application via the network interface.

Some or all aspects of the workflow or other operations described herein can be implemented by agents. In this context, agents, or AI agents, are autonomous software entities that utilize advanced artificial intelligence techniques-including large language models (LLMs), reinforcement learning (including contextual bandits), planning and scheduling algorithms, and other machine learning methods—to perceive their environment (potentially across text, images, audio, video, sensor streams, and structured data), interpret complex information, make context-aware decisions under uncertainty, and execute actions to achieve objectives defined by human operators or higher-level policies.

Such agents can orchestrate end-to-end pipelines by routing requests, performing semantic task decomposition, and coordinating data flow among heterogeneous components (e.g., rule engines, retrieval systems, analytics services, and specialized ML models). They can dynamically select and parameterize models (semantic routing, few-shot configuration, prompt/program synthesis), manage tool invocation (APIs, databases, vector stores, message queues, Robotic Process Automation (RPA), robotic/IoT actuators), and adapt behavior based on intermediate results, user feedback, or changing requirements. Agents can maintain short- and long-term memory, ground reasoning via retrieval-augmented generation, and update knowledge bases while enforcing data governance, privacy, and security constraints (e.g., PII redaction, access control, secret management, key rotation, policy enforcement).

Agents can operate singly or in multi-agent systems using patterns such as manager-worker, marketplace/contract-net, blackboard, and swarm collaboration, with negotiation, role assignment, and consensus. They support human-in-the-loop review and escalation, approval workflows, and guardrails (content filtering, compliance checks, safety policies). Operational capabilities include real-time monitoring, telemetry and tracing, drift and anomaly detection, self-healing retries and fallbacks, circuit breaking, autoscaling, batching and caching, cost/latency/energy optimization, A/B testing, canary releases, and continuous training or fine-tuning. They can manage data preparation and automated feature extraction, perform simulation and sandbox testing, ensure provenance with lineage and signed attestations, and produce detailed audit logs, explanations, uncertainty estimates, and rationales appropriate for regulated environments.

Deployment contexts include cloud, on-premises, edge, and air-gapped or intermittent-connectivity settings, with support for offline modes, state checkpoints, idempotent operations, and transactional guarantees. Through these capabilities, agents enable robust, transparent, and scalable automation across discovery, decision-making, execution, and continuous improvement with minimal human intervention while preserving oversight and accountability.

Various implementations of the subject matter described herein can be realized in digital electronic circuitry, integrated circuitry, specially designed application-specific integrated circuits (ASICs), field-programmable gate arrays (FPGAs), tensor processing units (TPUs), neural processing units (NPUs), or other artificial intelligence (AI) accelerators, computer hardware, firmware, software, and/or any combination thereof. Implementations can execute on heterogeneous, distributed, and/or virtualized computing environments, including on-premises systems, cloud platforms (public, private, hybrid, multi-cloud), edge and fog nodes, mobile and embedded devices, and Internet-of-Things (IoT) endpoints. Implementations can be embodied in one or more computer programs or non-transitory computer program products executable and/or interpretable on a programmable system including at least one programmable processor (e.g., central processing unit (CPU), graphics processing unit (GPU), digital signal processor (DSP), tensor processing unit (TPU), neural processing unit (NPU)), which can be special- or general-purpose, coupled to receive data and instructions from, and to transmit data and instructions to, one or more storage systems, input devices, and output devices.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), System Verilog) and accelerator programming models (e.g., Open Computing Language (OpenCL), SYCL). As used herein, "machine-readable medium" refers to any non-transitory computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. The term "non-transitory" as used herein excludes transitory propagating signals per se, but does not exclude information stored on non-transitory media. A "machine-readable signal" refers to any signal used to provide machine instructions and/or data to a programmable processor, including wired and wireless signals.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), System Verilog) and accelerator programming models (e.g., Open Computing Language (OpenCL), SYCL). As used herein, "machine-readable medium" refers to any computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. A "machine-readable signal" refers to any signal used to provide machine instructions and/or data to a programmable processor, including wired and wireless signals.

Storage systems can include volatile and non-volatile memory; local, network-attached, and distributed storage; file, block, and object stores; databases (relational, non-relational (NoSQL), graph, time-series), data warehouses, and data lakes. Processing and storage can be organized using virtualization and isolation technologies including hypervisors, virtual machines, containers, container orchestration systems, serverless functions, sandboxes, unikernels, and WebAssembly runtimes. Deployment and lifecycle management can utilize infrastructure-as-code, configuration management, continuous integration/continuous deployment (CI/CD) pipelines, and observability tooling (logging, metrics, tracing). Implementations can leverage security hardware and services such as trusted platform modules (TPMs), hardware security modules (HSMs), secure enclaves/trusted execution environments (TEEs), cryptographic modules, and identity and access management systems; and can employ encryption in transit and at rest, attestation, code signing, and secure boot.

To provide for interaction with a user, the subject matter can be implemented on devices with displays (e.g., light-emitting diode (LED), liquid crystal display (LCD), organic light-emitting diode (OLED), electronic ink (e-ink), augmented reality (AR), virtual reality (VR), mixed reality (MR) headsets) and input mechanisms (e.g., keyboard, mouse, trackball, touchpad, touchscreen, stylus, game controller, remote control). Additional input and feedback modalities can include microphones, speakers, cameras, depth sensors, biometric sensors, haptic devices, eye tracking, gesture recognition, voice assistants, and brain-computer interfaces. Feedback can be visual, auditory, haptic, or multimodal. Implementations can support accessibility features (e.g., screen readers, captioning, alternative input).

The subject matter can be implemented in a computing system including back-end components (e.g., data servers, storage clusters, compute clusters, artificial intelligence (AI) training/inference services), middleware components (e.g., application servers, message brokers, application programming interface (API) gateways, event streams), and/or front-end components (e.g., client applications, web browsers, mobile applications (apps), thin clients), or any combination thereof. Components can be interconnected by any form or medium of digital data communication, including wired and wireless networks and protocols such as Ethernet, InfiniBand, controller area network (CAN) bus, wireless fidelity (Wi Fi), Bluetooth/Bluetooth Low Energy (BLE), near-field communication (NFC), Zigbee, Z Wave, long range (LoRa)/LoRa wide area network (LoRaWAN), cellular (third generation (3G), fourth generation (4G), fifth generation (5G), sixth generation (6G)), satellite, mesh networks, and the Internet. Protocols can include transmission control protocol/internet protocol (TCP/IP), user datagram protocol (UDP), quick UDP internet connections (QUIC), hypertext transfer protocol (HTTP/2-HTTP/3), WebSockets, gRPC (gRPC remote procedure calls), message queuing telemetry transport (MQTT), advanced message queuing protocol (AMQP), constrained application protocol (CoAP), and industrial protocols. Systems can employ software-defined networking, load balancing, content delivery networks, caches, and time synchronization (e.g., network time protocol (NTP), precision time protocol (PTP)). Processing can occur centrally, at the edge, on-device, or in federated and/or privacy-preserving arrangements, and can support online, offline, batch, streaming, and real-time modes.

The computing system can include clients, servers, and other interconnected components that may be distributed across various physical or virtual locations. Clients and servers can be remote from each other and typically interact through one or more communication networks, which can include local area networks, wide area networks, the Internet, or wireless and mobile networks. Clients can include desktop computers, laptops, mobile devices, web browsers, thin clients, IoT devices, or edge nodes, while servers can include physical or virtual machines, cloud-based instances, microservices, containers, or serverless functions. The client-server relationship can be established by computer programs running on the respective devices, enabling communication, data exchange, and service orchestration. Modern computing environments can support multiple tiers and roles, such as peer-to-peer, edge-to-cloud, and hybrid architectures, where clients and servers may dynamically assume different roles, participate in distributed processing, and interact with middleware, APIs, and other services. These systems can leverage load balancing, failover, replication, and autoscaling to provide robust, scalable, and resilient operation across diverse deployment models.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more computing devices, the method comprising:

receiving an input file containing contact information;

parsing the input file to extract columns and rows of contact data;

computing an essential-field coverage metric based on the parsed input file, the essential-field coverage metric quantifying a degree to which parsed columns map to required contact fields;

responsive to the essential-field coverage metric meeting or exceeding a threshold, performing rule-based column mapping using exact header matching against one or more known external formats to generate a first mapping;

responsive to the essential-field coverage metric being below the threshold or rule-based column mapping being unavailable, invoking a large language model-based column mapping engine to produce a second mapping, the second mapping comprising a structured mapping output conforming to a predefined schema;

extracting contact information from the input file using the first mapping or the second mapping to generate structured contact data, verifying an address within the structured contact data, the verifying comprising;

classifying the address as an address of a first type, an address of a second type, or an address of an unknown type;

responsive to the address being classified as the first type, calling a first verification service to confirm accuracy of the address;

responsive to the address being classified as the second type, calling a second verification service to confirm accuracy of the address, the second verification service being different from the first verification service; and responsive to the address being classified as the unknown type, invoking a large language model to interpret address components and confirm accuracy of the address; and providing the structured contact data to a consuming application or process.

2. The method of claim 1, further comprising:

automatically detecting a file format of the input file by inspecting file extensions to identify format type, the file format being one of a delimited text format, a spreadsheet workbook format, or an electronic business card format.

3. The method of claim 2, further comprising:

responsive to the file format being the delimited text format, tokenizing records by line boundaries and splitting field values by a detected delimiter character with handling for quoted field values and escape sequences.

4. The method of claim 2, further comprising:

responsive to the file format being the spreadsheet workbook format, traversing cell ranges within one or more worksheets and extracting cell values along with data-type annotations.

5. The method of claim 2, further comprising:

responsive to the file format being the electronic business card format, interpreting property-value pairs according to a predefined specification and mapping the property-value pairs to a columnar representation.

6. The method of claim 1, further comprising:

generating metadata comprising a mapping confidence score, the essential-field coverage metric, and a decision reasoning record that documents whether the first mapping or the second mapping was selected, the metadata being serialized alongside the structured contact data for downstream audit and quality assessment.

7. The method of claim 1, further comprising:

responsive to detecting a failure condition comprising at least one of a network timeout, an inference endpoint outage, or an inference failure when invoking the large language model-based column mapping engine, reverting to a fallback mapping using relaxed heuristics.

8. The method of claim 7, wherein the relaxed heuristics comprise at least one of: normalization-based matching, underscore-to-space conversion, and abbreviation expansion; or fuzzy header matching using Levenshtein distance, Jaro-Winkler similarity, or substring containment.

9. The method of claim 1, further comprising:

normalizing the structured contact data by converting street type abbreviations to standardized forms, normalizing state and province names to standard postal abbreviations, formatting postal codes according to locale-specific patterns, and standardizing country names to a predefined specification.

10. The method of claim 1, further comprising:

validating the structured contact data by verifying that required fields are present, verifying that field values conform to expected data types and formats, verifying that field lengths do not exceed maximum permitted values, and annotating rejected contact rows with failure codes for remediation.

11. The method of claim 1, further comprising:

selecting among a plurality of inference service endpoints based on cost-optimized decision making that considers inference application programming interface (API) call latency, monetary cost per API call, current queue depth, and historical performance data.

12. The method of claim 1, further comprising:

prior to computing the essential-field coverage metric, performing smart header row detection comprising:

evaluating a first row of the input file as a primary header candidate;

responsive to validation of the first row failing, detecting exception patterns comprising at least one of empty rows, instruction blocks, metadata rows, or title blocks;

searching for an actual header row using characteristic analysis comprising matching cell contents against known header terms and evaluating keyword density; and responsive to no header row being identified through characteristic analysis, falling back to treating the first row as the header row.

13. The method of claim 1, wherein performing rule-based column mapping comprises:

in a first phase, performing exact string matching of source column headers against a header lexicon; and in a second phase, for headers not matched in the first phase, performing normalized matching comprising case normalization, underscore-to-space conversion, and abbreviation expansion.

14. The method of claim 1, wherein the threshold comprises a dual-threshold configuration, the method further comprising:

responsive to the essential-field coverage metric indicating that essential fields are satisfied, applying a lower confidence threshold for accepting the first mapping; and responsive to the essential-field coverage metric indicating that essential fields are not satisfied, applying a higher confidence threshold for accepting the first mapping.

15. The method of claim 1, wherein providing the structured contact data to the consuming application or process comprises transmitting, via a network interface, the structured contact data as a serialized data payload to a remote server, thereby reducing network bandwidth consumption compared to transmitting the input file in its original format.

16. The method of claim 1, further comprising:

instantiating, by one or more hardware processors, a file processor in a memory buffer, the file processor configured to receive the input file via a network interface;

generating, by the file processor, a parsed data structure stored in the memory buffer, the parsed data structure comprising a two-dimensional array of column headers and row values; and transmitting the parsed data structure to a column mapper for the rule-based column mapping or the large language model-based column mapping.

17. The method of claim 1, further comprising:

scaling, by a container orchestration system, a file processor, a column mapper, and a contact extractor independently based on processing load metrics; and allocating additional processing threads or memory buffers to bottleneck stages without over-provisioning resources for stages operating within capacity, wherein the scaling enables targeted resource allocation that conserves CPU cycles, memory allocations, and network bandwidth compared to non-scaled processing.

18. A computer-implemented method for ingesting and normalizing contact data using a modular multi-stage processing pipeline executing on a server computing device, the method comprising:

instantiating, by one or more hardware processors of the server computing device, a file processor in a memory buffer, the file processor configured to receive an input file via a network interface and automatically detect a file format of the input file by inspecting file extensions;

parsing, by the file processor executing on the one or more hardware processors, the input file according to the detected file format to generate a parsed data structure stored in the memory buffer, the parsed data structure comprising a two-dimensional array of column headers and row values;

instantiating, by the one or more hardware processors, a column mapper comprising a rule-based mapping engine and a large language model-powered mapping engine;

executing, by the rule-based mapping engine, exact header matching against a header lexicon to generate a first mapping associating source column indices with canonical field identifiers, and concurrently computing an essential-field coverage metric quantifying presence of name and address fields;

responsive to the essential-field coverage metric being below a configurable threshold, invoking, by the large language model-powered mapping engine, an inference service endpoint by transmitting a prompt payload comprising the column headers and a description of a target canonical schema via the network interface, and receiving a structured mapping output constrained to a predefined output schema encoded as a JSON schema or function-calling specification;

instantiating, by the one or more hardware processors, a contact extractor configured to receive the first mapping or the structured mapping output and the parsed data structure;

extracting, by the contact extractor, contact field values from each row of the parsed data structure using the received mapping, and normalizing the extracted field values into canonicalized contact records conforming to the target canonical schema;

validating, by the contact extractor, the canonicalized contact records by performing field-level checks comprising data type verification, format verification, and length verification, and annotating rejected rows with failure codes;

instantiating, by the one or more hardware processors, a metadata generator configured to generate metadata comprising mapping confidence, essential-field coverage percentage, and decision reasoning; and outputting, by the one or more hardware processors, a canonicalized contact dataset comprising the canonicalized contact records and the metadata to a downstream consuming application via the network interface.

19. The method of claim 18, further comprising:

executing, by the column mapper, a defined fallback sequence comprising:

attempting rule-based mapping using the rule-based mapping engine, evaluating the essential-field coverage metric, invoking the large language model-powered mapping engine when the essential-field coverage metric is below the configurable threshold, and reverting to rule-based fallback with relaxed heuristics upon detection of inference endpoint unavailability or failure.

20. The method of claim 19, further comprising:

recording, by the metadata generator, fallback events comprising a timestamp, an identifier of the inference service endpoint that failed, and an error code, the fallback events being included in the metadata for downstream audit.

21. The method of claim 18, further comprising:

dynamically selecting, by the one or more hardware processors, among a plurality of inference service endpoints operated by different large language model providers, the dynamic selection being based on service availability indicators and latency measurements obtained via health check requests transmitted via the network interface.

22. The method of claim 18, further comprising:

adapting, by the one or more hardware processors, cost-optimized decision making over time by logging provider selection events and applying a reinforcement learning algorithm or multi-armed bandit algorithm that balances exploration of provider options with exploitation of historically low-cost, high-reliability providers.

23. The method of claim 18, further comprising:

scaling, by a container orchestration system, the file processor, the column mapper, and the contact extractor independently based on processing load metrics, thereby allocating additional processing threads or memory buffers to bottleneck stages without over-provisioning resources for stages operating within capacity.

24. The method of claim 18, further comprising:

receiving, by the large language model-powered mapping engine in the structured mapping output, a confidence score per mapped field, and an explanation token sequence generated by the inference service endpoint articulating reasoning behind each mapping decision.

25. A system comprising:

one or more processors; and memory storing instructions that, when executed by the one or more processors, cause the system to:

receive an input file containing contact information;

parse the input file to extract columns and rows of contact data;

compute an essential-field coverage metric based on the parsed input file, the essential-field coverage metric quantifying a degree to which parsed columns map to required contact fields;

responsive to the essential-field coverage metric meeting or exceeding a threshold, perform rule-based column mapping using exact header matching against one or more known external formats to generate a first mapping;

responsive to the essential-field coverage metric being below the threshold or rule-based column mapping being unavailable, invoke a large language model-based column mapping engine to produce a second mapping, the second mapping comprising a structured mapping output conforming to a predefined schema;

extract contact information from the input file using the first mapping or the second mapping to generate structured contact data;

verify an address within the structured contact data by:

classifying the address as an address of a first type, an address of a second type, or an address of an unknown type;

responsive to the address being classified as the first type, calling a first verification service to confirm accuracy of the address;

responsive to the address being classified as the second type, calling a second verification service to confirm accuracy of the address, the second verification service being different from the first verification service; and responsive to the address being classified as the unknown type, invoking a large language model to interpret address components and confirm accuracy of the address; and provide the structured contact data to a consuming application or process.

26. The system of claim 25, wherein the instructions further cause the system to: automatically detect a file format of the input file by inspecting file extensions to identify format type, the file format being one of a delimited text format, a spreadsheet workbook format, or an electronic business card format.

27. The system of claim 25, wherein the instructions further cause the system to: generate metadata comprising a mapping confidence score, the essential-field coverage metric, and a decision reasoning record that documents whether the first mapping or the second mapping was selected, the metadata being serialized alongside the structured contact data for downstream audit and quality assessment.

28. The system of claim 25, wherein the instructions further cause the system to: responsive to detecting a failure condition comprising at least one of a network timeout, an inference endpoint outage, or an inference failure when invoking the large language model-based column mapping engine, revert to a fallback mapping using relaxed heuristics.

29. The system of claim 25, wherein the instructions further cause the system to: normalize the structured contact data by converting street type abbreviations to standardized forms, normalizing state and province names to standard postal abbreviations, formatting postal codes according to locale-specific patterns, and standardizing country names to a predefined specification.

30. A system for ingesting and normalizing contact data using a modular multi-stage processing pipeline, the system comprising:

one or more hardware processors of a server computing device; and memory storing instructions that, when executed by the one or more hardware processors, cause the system to:

instantiate a file processor in a memory buffer, the file processor configured to receive an input file via a network interface and automatically detect a file format of the input file by inspecting file extensions;

parse, by the file processor, the input file according to the detected file format to generate a parsed data structure stored in the memory buffer, the parsed data structure comprising a two-dimensional array of column headers and row values;

instantiate a column mapper comprising a rule-based mapping engine and a large language model-powered mapping engine;

execute, by the rule-based mapping engine, exact header matching against a header lexicon to generate a first mapping associating source column indices with canonical field identifiers, and concurrently compute an essential-field coverage metric quantifying presence of name and address fields;

responsive to the essential-field coverage metric being below a configurable threshold, invoke, by the large language model-powered mapping engine, an inference service endpoint by transmitting a prompt payload comprising the column headers and a description of a target canonical schema via the network interface, and receive a structured mapping output constrained to a predefined output schema encoded as a JSON schema or function-calling specification;

instantiate a contact extractor configured to receive the first mapping or the structured mapping output and the parsed data structure;

extract, by the contact extractor, contact field values from each row of the parsed data structure using the received mapping, and normalize the extracted field values into canonicalized contact records conforming to the target canonical schema;

validate, by the contact extractor, the canonicalized contact records by performing field-level checks comprising data type verification, format verification, and length verification, and annotate rejected rows with failure codes;

instantiate a metadata generator configured to generate metadata comprising mapping confidence, essential-field coverage percentage, and decision reasoning; and output a canonicalized contact dataset comprising the canonicalized contact records and the metadata to a downstream consuming application via the network interface.

* * * * *